United States Patent [19]

Yokogi et al.

[11] Patent Number: 4,535,028

[45] Date of Patent: Aug. 13, 1985

[54] HOLLOW FIBER OF CUPRAMMONIUM REGENERATED CELLULOSE AND PROCESS FOR PRODUCING THE SAME

[75] Inventors: Masanobu Yokogi; Yoshifumi Sugimoto; Yotsuo Ono, all of Miyazaki, Japan

[73] Assignees: Asahi Kasei Kogyo Kabushiki Kaisha; Asahi Medical Co., Ltd., both of Tokyo, Japan

[21] Appl. No.: 427,296

[22] Filed: Sep. 29, 1982

[30] Foreign Application Priority Data

Oct. 1, 1981 [JP] Japan ............................ 56-154808

[51] Int. Cl.$^3$ .................... D02G 3/00; B01D 39/00
[52] U.S. Cl. .................................. 428/398; 428/364; 210/500.2; 55/158; 264/209.1; 264/199
[58] Field of Search .................... 428/397, 398, 364; 210/500.2; 55/158; 264/209.1, 199

[56] References Cited

U.S. PATENT DOCUMENTS

| | | | |
|---|---|---|---|
| 3,888,771 | 6/1975 | Isuge et al. | 210/500 |
| 4,203,844 | 5/1980 | Amicel et al. | 55/158 |
| 4,371,487 | 1/1983 | Hamada et al. | 210/500.2 |

FOREIGN PATENT DOCUMENTS

| | | | |
|---|---|---|---|
| 2035197 | 6/1980 | United Kingdom | 55/158 |
| 2089285 | 6/1982 | United Kingdom | 55/158 |

*Primary Examiner*—Marion E. McCamish
*Assistant Examiner*—Beverly K. Johnson
*Attorney, Agent, or Firm*—Finnegan, Henderson, Farabow, Garrett & Dunner

[57] ABSTRACT

A hollow fiber of cuprammonium regenerated cellulose having an axially disposed cylindrical bore extending throughout the fiber length, said bore being filled with a gas. The hollow fiber exhibits an improved dialysis performance and ultrafiltration rate over the conventional hollow fiber. Such a hollow fiber can be produced by a process comprising (a) extruding a spinning dope through an annular orifice while simultaneously injecting a gas into the bore as it is formed, and (b) allowing the fiber extrudate to free fall in an air space and dive into a depth of from 2 to 20 mm below the surface of a coagulation bath only with a downward force gained during said free fall.

12 Claims, No Drawings

HOLLOW FIBER OF CUPRAMMONIUM REGENERATED CELLULOSE AND PROCESS FOR PRODUCING THE SAME

This invention relates to a hollow fiber of cuprammonium regenerated cellulose and process for producing the same. More particularly, this invention is concerned with a hollow fiber of cuprammonium regenerated cellulose having an axially disposed cylindrical bore extending throughout the fiber length, said bore being filled with a gas, and a dry jet-wet spinning process for producing said hollow fiber. The present invention is also concerned with the use of said hollow fiber as a dialysis membrane.

In the recent years, there has been an ever-increasing demand for hollow fibers of cuprammonium regenerated cellulose (hereinafter frequently referred to as cuprammonium hollow fibers) to be incorporated in an artificial kidney and other dialysis apparatus. Heretofore, cuprammonium hollow fibers have been produced by the steps of:

(1) extruding a spinning dope (solution) of cuprammonium cellulose through an annular orifice to form a hollow fiber extrudate while simultaneously injecting an organic liquid (hereinafter simply referred to as a liquid), such as isopropyl myristate, which does not coagulate the spinning dope, into the bore of the fiber extrudate as it is formed through an injection tube provided in the center of the annular orifice;
(2) allowing said fiber extrudate to free fall in an air space to effect sufficient stretching thereof;
(3) passing the fiber extrudate through the coagulation bath to obtain a coagulated hollow fiber;
(4) regenerating and washing the coagulated hollow fiber; and
(5) drying, and winding up on a spool or hank frame, the resulting hollow fiber.

The cuprammonium hollow fibers produced by the above conventional process contains in their bores the liquid injected through the injection tube provided in the center of the annular orifice. When the conventional cuprammonium hollow fibers are utilized as dialysis membrane, it is needed to remove the liquid from the hollow fibers, before, during, or after the assembly of a dialysis module. According to the present inventors' study, the liquid cannot be completely removed from the conventional hollow fibers having an inside diameter of several ten to several hundred microns unless they are cut into pieces of several ten centimeters in length. Usually, the conventional cuprammonium hollow fibers are cut into pieces of several ten centimeters, bundled, and then subjected to removal of the liquid filling the bore of the hollow fibers. Removal of the liquid is effected physically by applying gravity force, centrifugal force and/or vacuum drying, or chemically by rinsing with an organic solvent or the like. Alternatively, removal of the liquid may be accomplished by a combination of such physical and chemical means. However, any means to remove the liquid from the hollow fibers having a very small inside diameter is laborious work, and gravely increases the product cost. In addition, when the liquid is not recovered or recycled, it becomes an additional factor to increase the total cost covering the production of cuprammonium hollow fibers and the assembly of dialysis modules.

Furthermore, a small amount of the liquid inevitably remains on the inside wall of hollow fibers even if the above-mentioned physical and chemical means to remove the liquid are repeated. Since the major application of cuprammonium hollow fibers has long been appreciable in the filed of haemodialysis for chronic kidney-disease patients, it is of course desired that there is no trace of such liquid remaining on the inside wall of the hollow fibers.

For the above-reasons, there has been a strong demand in the art that a new process be developed for producing a cuprammonium hollow fiber without using the liquid to maintain the bore at the spinning stage.

In line with the above-mentioned demand in the art, we have made extensive and intensive studies for a long period of time. Persons skilled in the art would recognize that it would be desirable if hollow fibers could be obtained by using a gas instead of a liquid at the spinning stage. However, they have believed that a gas could not be used to form hollow fibers of cuprammonium regenerated cellulose, since the use of a gas, which is compressible, would not form a hollow fiber having an axially disposed cylindrical bore extending throughout the fiber length and having a uniform wall thickness.

The present inventors have challenged the conventional concept, and have succeeded in solving encountered problems to accomplish the present invention as a result of long-term studies.

It is, therefore, an object of the present invention to provide a hollow fiber of cuprammonium regenerated cellulose having an axially disposed cylindrical bore extending throughout the fiber length, said bore being filled with a gas and containing no trace of a contaminating liquid.

It is another object of the present invention to provide a process for producing such a hollow fiber of the kind described above.

It is a further object of the present invention to provide the use as dialysis membrane of said hollow fiber.

The foregoing and other objects, features and advantages of the present invention will be apparent to those skilled in the art from the following detailed description and appended claims.

In one aspect of this invention, there is provided a hollow fiber of cuprammonium regenerated cellulose having an axially disposed cylindrical bore extending throughout the fiber length, said fiber length being at least 10 m and said bore being filled with a gas.

From the viewpoint of utilizing for a haemodialysis module and other dialysis apparatus, it is desired that the length of the cuprammonium hollow fiber of the present invention be at least 10 m, preferably 100 m or more. Further, it is preferred that the wall thickness of the cuprammonium hollow fiber of the present invention be from 2 to 60 microns, more preferably from 5 to 40 microns, and that the bore thereof have a substantially circular cross-section of from 50 to 800 microns in diameter. If the wall thickness is less than 2 microns, the mechanical strength of the hollow fiber becomes insufficient. If the wall thickness is more than 60 microns, the dialysis performance of the hollow fiber disadvantageously lowers. The inside diameter of the hollow fiber should preferably be 50 to 800 microns from the viewpoints of the production easiness and dialysis efficiency of the hollow fiber.

In practice, the hollow fiber of the present invention is supplied in a wound-up form. The way of winding up the hollow fiber is not critical. However, it is preferred that the cuprammonium hollow fiber of the present invention be supplied in a cheese, hank or cake form.

The cuprammonium hollow fiber of the present invention can be cut into pieces, bundled and incorporated in a dialysis module without needing extra work of removing a liquid.

Further, surprisingly, it has been confirmed that the cuprammonium hollow fibers of the present invention can be easily assembled into a module to constitute an artificial kidney in high yield, and the dialysis performance thereof is remarkably improved, over the conventional cuprammonium hollow fibers. As different from the hollow fibers of synthetic polymers and regenerated cellulose from cellulose derivatives, such as cellulose acetate, the cuprammonium hollow fibers are vulnerable to temperature and humidity changes. The morphology and performance of the cuprammonium hollow fiber markedly changes when the temperature and humidity are varied. Accordingly, the conventional cuprammonium hollow fibers undergo a morphology change and performance degradation due to the irreversible thermal and humid changes imposed when conducting physical and chemical treatments to remove the liquid contained in the bore of the hollow fibers. For example, the edges of the cuprammonium hollow fibers curl due to the irreversible thermal and humid changes imposed when conducting physical and chemical treatments to remove the liquid, whereby the bundle of the hollow fibers suffers a morphology disorder so that its insertion into a dialysis module is hampered, decreasing yield of assembly. For the cuprammonium hollow fibers of the present invention, the step of removing the liquid is avoided. Therefore, the cuprammonium hollow fibers of the present invention can be assembled into an artificial kidney or other dialysis apparatus whithout having the above-described drawbacks.

In another aspect of the present invention, there is provided a process for producing a hollow fiber of cuprammonium regenerated cellulose having an axially disposed cylindrical bore extending throughout the fiber length, said bore being filled with a gas, which comprises the steps of:

(1) extruding a spinning solution of cuprammonium cellulose through an annular orifice to form a fiber extrudate with a bore while simultaneously injecting a gas into the bore of the fiber extrudate through an injection tube provided in the center of the annular orifice;

(2) allowing said fiber extrudate to free fall in an air space and substantially vertically dive into a depth of from 2 to 20 mm below the surface of a coagulation bath only with a downward force gained during said free fall;

(3) passing the fiber extrudate through the coagulation bath to obtain a hollow fiber having an axially disposed cylindrical bore; and (4) refining and drying the so-obtained hollow fiber.

The use of a gas to form a hollow fiber is not novel with respect to the melt spinning and dry spinning methods as well as the wet spinning of synthetic polymers (see, for example, Japanese Patent Application Laid-Open Specification Nos. 86834/1978 and 55623/1979). However, it is novel with respect to the wet spinning of cellulose materials, especially a cuprammonium cellulose solution.

After making several attempts to form a cuproammonium hollow fiber with the use of a gas at the spinning stage on the basis of knowledge concerning the conventional process for producing a cuprammonium hollow fiber in which a liquid is utilized and the conventional process for producing a non-cuprammonium hollow fiber in which a gas is utilized, the present inventors learned that the intended cuprammonium hollow fiber can be obtained only by resolving the problems which had never been experienced with respect to the conventional processes.

Illustratively stated, when a fiber extrudate is allowed to free fall in open air space to enter a coagulation bath, forced to change its direction of move by means of a direction-turning rod and let travel through the coagulation bath as according to the conventional processes, the fiber extrudate is caused to suffer serious undulation in the vertical direction during the free fall, which undulation finally leads to break of the fiber. On the other hand, when the direction-turning rod is removed in the above process, the fiber extrudate travels on the surface of the coagulation bath, whereby crosssectional eccentricity of the hollow fiber is caused to occur due to the downward flow of the unsolidified spinning solution on the circular wall of the fiber extrudate, said eccentricity meaning that the wall thickness varies according to different portions of the fiber cross-section.

After extensive studies, the present inventors considered that the most substantial difference between the spinning of a cuprammonium cellulose solution using a gas and the spinning of a synthetic polymer solution or the like using a gas resides in that the fiber extrudate of a synthetic polymer solution or the like promptly solidifies due to the temperature decrease and solvent evaporation during the free fall, thereby giving force to maintain the morphology of the hollow fiber, whereas the fiber extrudate of a cuprammonium cellulose solution never solidifies during the free fall in open air space and very slowly solidifies after entering the coagulation bath. Further, the present inventors considered that the above-mentioned undulation is caused to occur due to the upward push of the gas enclosed in the fiber extrudate, which push results from the substantial buoyancy generated by entry of the fiber extrudate into the coagulation bath and imposed before the fiber extrudate sufficiently solidifies.

As a result of long-term researches based on this concept, we have resolved the above-mentioned problems of undulation and eccentricity, and completed the process of the present invention.

In the conventional wet spinning process of a cuprammonium hollow fiber, the fiber extrudate is allowed to free fall in open air space (or alternatively directly into a coagulation bath), substantially vertically run a predetermined length in the coagulation bath, and caused to change its direction of move so as to substantially horizontally travel before being transferred to the subsequent step. When the bore of the hollow fiber is filled with a liquid, the above-mentioned impact of the buoyancy can be ignored. Therefore, the fiber extrudate can enter the coagulation bath without encountering any significant resistance, and can substantially vertically run a predetermined length in the coagulation bath due to downward force gained during the free fall and force imparted via a direction-turning rod or rolles. In the conventional wet spinning process, usually, the fiber extrudate substantially vertically runs several to several ten centimeters in the coagulation bath before being caused to change its direction of move and transferred to the subsequent step.

As different from the above-described conventional process, the process of the present invention is characterized by controlling the vertical length in which the fiber extrudate free falls so that the fiber extrudate may dive into a depth of from 2 to 20 mm, preferably from 2 to 10 mm, more preferably from 3 to 8 mm, below the surface of the coagulation bath only by downward force gained during the free fall. When the fiber extrudate is passed through the coagulation bath within a depth of less than 2 mm or on the surface of the coagulation bath because of the surface tension of the coagulating solution, which is caused to occur when the length of free fall is too small, the horizontal move of the unsolidified fiber extrudate leads to the downward flow of the unsolidified spinning solution on the circular wall of the fiber extrudate, thereby generating a hollow fiber having an eccentric cross-section. On the other hand, when the length of free fall is too large, there occurs a sag of the fiber extrudate above the surface of the coagulation bath, whereby the fiber extrudate cannot substantially vertically enter the coagulation bath, thereby causing a whirlpool to occur on the surface thereof. In this situation, a steady spinning becomes impossible, and break of the fiber tends to frequently occur. Further, the hollow fiber thus obtained is not diamensionally uniform along the fiber axis.

Once an appropriate length of free fall is determined so as to allow the fiber extrudate to dive into a depth of from 2 to 20 mm below the surface of the coagulation bath, coagulation of the fiber extrudate can be effected either using or without using a direction-turning rod. When a direction-turning rod is used, the above-mentioned depth can be increased by up to 10 mm, preferably up to 5 mm.

The present inventors have for the first time developed the above-described spinning process of a hollow fiber in which the length of free fall of a fiber extrudate in open air space is controlled, which process ensures steady spinning free from the troubles of undulation and eccentricity. Besides the control of the length of free fall, it is essential to appropriately effect extrusion of a spinning solution and injection of a gas as explained hereinbelow. If these are effected in an inappropriate manner, undulation of the fiber extrudate occurs just upon extrusion thereof.

A cuprammonium cellulose spinning solution to be employed in the process of the present invention may be prepared according to customary procedures, employing customary solvents. However, it is preferred that the spinning solution have a cellulose concentration of from 6 to 12% by weight.

The delivery rate of a spinning solution is determined according to the inside diameter, wall thickness and winding speed of the intended hollow fiber. However, it is preferred that the average linear velocity of the delivery of a spinning solution be from 7 to 30 m/min, more preferably from 11 to 30 m/min. When it is less than 7 m/min, vigorous undulation of the fiber extrudate, occasionally break thereof during the free fall, occurs even if injection of the gas is minimized. Further, it was confirmed that even if a spinneret of different size is employed, delivery of a spinning solution at an average linear velocity of from 7 to 30 m/min, preferably from 11 to 30 m/min, ensures steady spinning of a cuprammonium hollow fiber.

Incidentally, in the conventional wet spinning process of a cuprammonium hollow fiber using a liquid to fill the bore thereof, the average linear velocity of the delivery of a spinning solution is set at about 1 to 2 m/min.

The delivery rate of a gas to fill the bore of a cuprammonium hollow fiber is determined according to the inside diameter, wall thickness and winding speed of the intended hollow fiber as well as the escape rate of the gas through the wall of the hollow fiber during the steps from extrusion of a spinning solution to winding of the resulting hollow fiber. The injection pressure of the gas is varied depending on the inside diameter of the injection tube disposed in the center of the orifice of a spinneret. When the injection pressure of the gas is too high, the fiber extrudate of a spinning solution undergoes undulation, wherefore a hollow fiber of uniform morphology cannot be obtained. The present inventors found that it is preferred to ensure steady extrusion of a fiber extrudate that the inside diameter of the injection tube be determined so that the injection pressure of the gas may be a positive pressure higher than the external atmospheric pressure by up to 100 mm $H_2O$, preferably 70 mm $H_2O$. According to the process of the present invention, the gas is injected into the bore of a fiber extrudate under the above-mentioned injection pressure. Then, the fiber extrudate is allowed to free fall in open air space, thereby effecting sufficient stretching thereof, before substantially vertically entering the coagulation bath.

The kind of the gas to fill the bore of a cuprammonium hollow fiber according to the present invention is not critical if it is gaseous at ordinary temperatures. It is preferred that a gas which neither reacts with nor coagulates the spinning solution be employed. Further, from the viewpoint of utilizing the hollow fiber for haemodialysis purposes, the gas should have no toxicity. As the suitable gas, there can be mentioned, for example, air, paraffin gases, olefin gases, halogenated hydrocarbon gases (perfluorohydrocarbon, fluorochlorohydrocarbon, etc.) and novel gases. Of them, air, which usually comprises, as components, oxygen, nitrogen, argon, carbon dioxide, neon, helium, krypton, and xenon, a component, and a mixture of components, thereof are most preferred for the reason of handling convenience. The gas is fed through a gas flow-rate control unit which can accurately supply a minutely controlled amount of the gas. According to the process of the present invention, the fiber extrudate thus appropriately extruded is allowed to free fall in open air space, coagulated in the coagulation bath (typically, an aqueous solution of sodium hydroxide), lifted up therefrom, dropped on a net conveyor, refined with diluted aqueous sulfuric acid and water, dried and wound up on a spool or hank frame.

The cuprammonium hollow fiber thus obtained has an axially disposed cylindrical bore extending throughout the fiber length, said bore being filled with a gas. The hollow fiber is cut into pieces of several ten centimeters in length before being incorporated into a dialysis module. The gas enclosed in the bore of the hollow fiber of that length promptly mixes with or diffuses into the external air.

The cuprammonium hollow fiber of the present invention has as uniform a wall thickness and circular cross-section as that obtained according to the conventional process using a liquid to fill the bore of the fiber. Further, the cuprammonium hollow fiber of the present invention has substantially the same tensile strength and elongation as the conventional one.

In a further aspect of the present invention, there is provided a method of utilizing as a dialysis membrane the cuprammonium hollow fiber of the present invention.

According to the process of the present invention, it is possible to produce a cuprammonium hollow fiber having a widely varied wall thickness and inside diameter. For the use as a dialysis membrane, however, it is preferred that the hollow fiber have an inside diameter of from 50 to 800 microns and a wall thickness of from 2 to 60 microns, more preferably from 5 to 40 microns.

In utilizing the cuprammonium hollow fiber as a haemodialyses membrane, the hollow fiber is cut into pieces of several ten centimeters, and several thousand or several ten thousand pieces of the hollow fiber are bundled and incorporated in an artificial kidney or other haemodialysis apparatus. The cuprammonium hollow fiber of the present invention can be subjected to such cutting and bundling without any significant troubles of crush, deformation or bend of the hollow fiber. The artificial kidney in which the cuprammonium hollow fibers of the present invention are incorporated exhibits an improved dialysis performance over the conventional one. Further, the cuprammonium hollow fibers of the present invention are assembled into an artificial kidney in higher yield.

According to the process of the present invention, it is possible to produce a cuprammonium hollow fiber having an outside diameter increase by wetting, as defined later, of from 10 to 50%, depending on the escape rate of the gas through the wall of the hollow fiber. The use of a hollow fiber having an outside diameter increase by wetting of from 25 to 50% favorably increases the ratio of the volume of the hollow fibers relative to the volume of the dialysis module.

The present invention will now be described in more detail with reference to the following Examples that by no means limit the scope of the invention.

In the following Examples and Comparative Example, the properties of hollow fibers of cuprammonium regenerated cellulose are determined according to the following methods.

1. Outside Diameter and Wall Thickness of Hollow Fibers

About ten hollow fibers to be examined were guided, together with a packing material of non-woven fabric, through the hole provided in the center of a 20 mm by 50 mm opaque plate of polyvinyl chloride having a thickness of 2 mm so that the fibers could be securely held in the hole. The fibers were cut with a razor just above the plane of the upper surface of the plate and just beneath the plane of the lower surface of the plate to obtain horizontal cross sections. The so-obtained cross sections were lighted by a lamp placed therebelow and the 200-times magnified images were projected on a screen by means of a profile projector. The outside diameter and wall thickness of each of the hollow fibers were measured using a scale on the screen. The actual sizes were calculated from the measured values.

2. Effective Filtering Area

The Effective Filtering Area of a dialyzing unit was calculated by the formula of:

$$n \times l \times 2\pi r$$

wherein n represents the number of hollow fibers incorporated in the dialyzing unit, and l and r represent the length, and half of the inside diameter, respectively, of each of the hollow fibers incorporated in the dialyzing unit.

3. Urea and Albumin Removal Percents

In conducting in-vitro dialysis, the concentration of urea ($C_{Bi}$) in an aqueous solution of 0.1% by weight albumin and 0.167N urea before being introduced into a dialyzing unit and that ($C_{Bo}$) in the aqueous solution flowing out of the dialyzing unit were measured by means of liquid chromatography according to customary procedures. The Urea Removal Percent was calculated by the formula of:

$$\frac{C_{Bi} - C_{Bo}}{C_{Bi}} \times 100\ (\%)$$

Substantially the same procedures as above were repeated to obtain the Albumin Removal Percent.

4. Urea and Vitamin $B_{12}$ Removal Percents

These were determined in substantially the same manner as described in item 3 above, except that an aqueous solution of 1000 ppm urea and 100 ppm Vitamin $B_{12}$ was employed.

5. Ultrafiltration Rate of Water

This was determined according to customary procedures using water maintained at a temperature of 37° C., which temperature was chosen to simulate the body temperature of human being.

6. Tensile Breaking Strength and Elongation

Autograph tensile tester manufactured and sold by Shimadzu Corporation was employed.

7. Outside Diameter Increase by Wetting (%)

The outside diameter of the cross section of a dry hollow fiber was measured under an optical microscope, using a transmitted light. Then, the hollow fiber was immersed in a water bath maintained at 37° C. for a period of one hour. The hollow fiber was taken out from the water bath, wiped with a filter paper to absorb the water around the fiber, and immediately subjected to the measurement of its outside diameter as mentioned above before any significant drying or shrinkage of the swollen fiber occurs. The Outside Diameter Increase by Wetting (%) is calculated by the following equation:

$$O.D.\ \text{Increase}\ (\%) = \left( \frac{O.D.\ \text{of wet fiber}}{O.D.\ \text{of dry fiber}} - 1 \right) \times 100$$

wherein O.D. stands for outside diameter.

EXAMPLE 1

A cuprammonium cellulose spinning solution having a viscosity of 2000 poises at room temperature and having cellulose, ammonia and copper concentrations of 10.0% by weight, 7.0% by weight and 3.6% by weight, respectively, was prepared according to customary procedures and extruded through a spinneret having an orifice diameter of 1.30 mm, an injection-tube outside diameter of 0.50 mm and an injection-tube inside diameter of 0.25 mm at a delivery rate of 19.5 ml/min to form a fiber extrudate with a bore while simultaneously injecting gaseous nitrogen through the injection tube disposed in the center of the orifice into the bore at a delivery rate of 5 ml/min. The pressure of injected gaseous nitrogen was set at a pressure 50 mm H$_2$O higher than the external atmospheric pressure. The average linear velocity of the delivery of the extrudate was 17.2 m/min.

The fiber extrudate with a bore was allowed to free fall under gravity by a vertical length of 400 mm in open air atmosphere, whereby the fiber extrudate was sufficiently stretched by gravity force, before substantially vertically entering a coagulation bath of 11% by weight aqueous sodium hydroxide maintained at 25° C. It was confirmed with the use of a measuring rule that the fiber extrudate dived into a depth of 5.5 mm below the surface of the coagulation bath. The fiber extrudate was coagulated in the coagulation bath, and the resulting coagulated hollow fiber was caused to change its direction of move as naturally as possible by exertion of winding force so as to travel substantially horizontally through the coagulation bath before being lifted up therefrom. Then, the coagulated hollow fiber was dropped by means of rolls on a net conveyor. The coagulated hollow fiber was sufficiently rinsed with 3% by weight aqueous sulfuric acid on the moving net conveyor to effect regeneration of the cellulose. The resulting hollow fiber was further sufficiently rinsed with water, lifted up from the net conveyor, passed horizontally through a tunnel drier, and wound up on a spool at a winding speed of 80 m/min. The obtained hollow fiber contained gaseous nitrogen in its bore, and no portion of the hollow fiber on the spool broke despite the pressure imposed by upper layers of the hollow fiber. The thus obtained hollow fiber had an outside diameter of 240 microns, an inside diameter of 192 microns and a wall thickness of 24 microns. The hollow fiber had a uniform, axially disposed cylindrical bore extending throughout the fiber length without break, and any portion of the hollow fiber had a uniformly annular cross-section. The hollow fiber was cut into pieces of 200 mm in length, and 10,000 pieces of the hollow fiber were bundled to be incorporated in a dialyzing unit.

Physical properties, and the test data when applied for dialysis and ultrafiltration, of the obtained hollow fiber are given in Table 1, together with those of a conventional hollow fiber.

As apparent from Table 1, the hollow fiber of the present invention exhibits an improved dialysis performance and ultrafiltration rate over the conventional hollow fiber.

TABLE 1

| | Item | Unit | Conventional Hollow Fiber | Hollow Fiber of Present Invention |
|---|---|---|---|---|
| Sample Employed | Outside Diameter | μm | 290 | 240 |
| | Wall Thickness | μm | 25 | 24 |
| | Outside Diameter Increase by Wetting | % | | 30 |
| Dialyzing Conditions | Effective Filtering Area | m$^2$ | 1.0 | 1.0 |
| | Length of Hollow Fiber | mm | 135 | 135 |
| | Solution Passage Rate | ml/min | 200 | 200 |
| | Buffer Passage Rate | ml/min | 500 | 500 |

TABLE 1-continued

| | Item | Unit | Conventional Hollow Fiber | Hollow Fiber of Present Invention |
|---|---|---|---|---|
| | Pressure Differential | mmHg | −200 | −200 |
| Dialyzing Performance | Urea Removal Percent | % | 64.2 | 66.5 |
| | Albumin Removal Percent | % | 0 | 0 |
| Ultrafiltration | Treating Condition (pressure) | mmHg | +400 | +400 |
| | Filtration Rate | ml/m$^2$·hr | 1020 | 1080 |
| Mechanical Property | Tensile Strength (dry/wet) | g/d | 1.3/0.5 | 1.3/0.5 |
| | Elongation (dry/wet) | % | 40/70 | 40/70 |
| | Yield in artificial kidney assembly | % | 95% | 98% |

EXAMPLE 2

Substantially the same procedures as employed in Example 1 were repeated to obtain a hollow fiber having an outside diameter of 350 microns, an inside diameter of 300 microns and a wall thickness of 25 microns. More specifically, the cuprammonium cellulose spinning solution as mentioned in Example 1 was extruded through a spinneret having an orifice diameter of 1.30 mm, an injection-tube outside diameter of 0.50 mm and an injection-tube inside diameter of 0.25 mm at a delivery rate of 22.9 ml/min while simultaneously injecting gaseous nitrogen through the injection tube into the bore as it was formed at a delivery rate of 9.2 ml/min. The pressure of injected gaseous nitrogen was set at a pressure 20 mmH$_2$O higher than the external atmospheric pressure. The average linear velocity of the delivery of the fiber extrudate was 20 m/min.

The fiber extrudate was allowed to free fall under gravity to thereby effect sufficient stretching thereof. It was confirmed that the fiber extrudate dived into a depth of 8 mm below the surface of the coagulation bath of 11% by weight aqueous sodium hydroxide. The coagulated hollow fiber was treated with dilute sulfuric acid, rinsed, dried and wound up on a hank frame at a winding speed of 60 m/min, in the same manner as mentioned in Example 1.

The resulting hollow fiber had a uniform, axially disposed cylindrical bore extending throughout the fiber length without break, and any portion of the hollow fiber had a uniformly annular cross-section.

The hollow fiber wound in a hank form was cut into pieces of 200 mm in length, and 10,000 pieces of the hollow fiber were bundled to be incorporated in a dialyzing unit.

The resulting hollow fiber exhibited a excellent dialysis performance, ultrafiltration rate and mechanical strength as that obtained in Example 1 did.

EXAMPLE 3

A cuprammonium cellulose spinning solution having a viscosity of 2000 poises at room temperature and having cellulose, ammonia and copper concentrations of 10.0% by weight, 7.0% by weight and 3.6% by weight, respectively, was prepared according to customary procedures and extruded through a spinneret having an orifice diameter of 1.00 mm, an injection-tube outside diameter of 0.50 mm and an injection-tube inside diameter of 0.25 mm at a delivery rate of 10.5 ml/min to form a fiber extrudate with a bore while simultaneously injecting gaseous nitrogen through the injection tube disposed in the center of the orifice into the bore at a delivery rate of 3.6 ml/min. The pressure of injected gaseous nitrogen was set at a pressure 52 mmH$_2$O higher than the external atmospheric pressure. The average linear velocity of the delivery of the extrudate was 17.5 m/min.

The fiber extrudate with a bore was allowed to free fall under gravity by a vertical length of 520 mm in open air atmosphere, whereby the fiber extrudate was sufficiently stretched by gravity force, before substantially vertically entering a coagulation bath of 11% by weight aqueous sodium hydroxide maintained at 25° C. It was confirmed with the use of a measuring rule that the fiber extrudate dived into a depth of 6.0 mm below the surface of the coagulation bath. The fiber extrudate was coagulated in the coagulation bath, and the resulting coagulated hollow fiber was caused to change its direction of move as naturally as possible by exertion of winding force so as to travel substantially horizontally through the coagulation bath before being lifted up therefrom. Then, the coagulated hollow fiber was dropped by means of rolls on a net conveyor. The coagulated hollow fiber was sufficiently rinsed with 3% by weight aqueous sulfuric acid on the moving net conveyor to effect regeneration of the cellulose. The resulting hollow fiber was further sufficiently rinsed with water, lifted up from the net conveyor, passed horizontally through a tunnel drier, and wound up on a spool at a winding speed of 80 m/min. The thus obtained hollow fiber had an outside diameter of 228 microns, an inside diameter of 200 microns and a wall thickness of 14 microns. The hollow fiber had a uniform, axially disposed cylindrical bore extending throughout the fiber length without break, and any portion of the hollow fiber had a uniformly annular cross-section. The hollow fiber was not accompanied by any drawback of eccentricity and undulation throughout the fiber length.

Physical properties, and the test data when applied for dialysis and ultrafiltration, of the obtained hollow fiber are given in Table 2, together with those of a conventional hollow fiber.

As apparent from Table 2, the hollow fiber of the present invention exhibits an improved dialysis performance and ultrafiltration rate over the conventional hollow fiber.

TABLE 2

| | Item | Unit | Conventional Hollow Fiber | Hollow Fiber of Present Invention |
|---|---|---|---|---|
| Sample Employed | Outside Diameter | μm | 228 | 228 |
| | Wall Thickness | μm | 14 | 14 |
| | Outside Diameter Increase by Wetting | % | | 18 |
| Dialyzing Conditions | Effective Filtering Area | m$^2$ | 1.0 | 1.0 |
| | Length of Hollow Fiber | mm | 135 | 135 |
| | Solution Passage Rate | ml/min | 200 | 200 |
| | Buffer Passage Rate | ml/min | 500 | 500 |
| | Pressure Differential | mmHg | −200 | −200 |
| Dialyzing Performance | Urea Removal | % | 79 | 83 |
| | Percent VB$_{12}$ Removal | % | 19 | 22 |
| Ultrafiltration | Percent Treating Condition (pressure) | mmHg | +400 | +400 |
| | Filtration Rate | ml/m$^2$.hr | 1440 | 1600 |
| Mechanical Property | Tensile Strength (dry/wet) | g/d | 1.3/0.5 | 1.3/0.5 |
| | Elongation (dry/wet) | % | 40/70 | 40/70 |
| Yield in artificial kidney assembly | | % | 95% | 98% |

COMPARATIVE EXAMPLE 1

All operations up to the point of extruding a fiber extrudate were carried out as in Example 1.

The fiber extrudate with a bore was allowed to free fall under gravity by a vertical length of 350 mm in open air atmosphere before substantially vertically contacting a coagulation bath of 11% by weight aqueous sodium hydroxide. The fiber extrudate did not dive into any significant depth and traveled on the surface of the coagulation bath because of the buoyancy due to the gas enclosed in the fiber extrudate. The resulting hollow fiber had eccentric cross-sections along the axis of the fiber, and it was impossible to utilize it for practical purposes.

Besides, when the fiber extrudate was forced to dive into a predetermined depth by means of a direction-turning rod, undulation, or occasionally break, of the fiber occurred. This was true when the depth was varied.

What is claimed is:

1. A hollow fiber of cuprammonium regenerated cellulose having an axially disposed cylindrical bore extending throughout the fiber length, said fiber length being at least 10 m, said bore having an inside diameter of from 50 to 800 microns and being filled with a gas, and said hollow fiber having on its inside wall no trace of a liquid.

2. A hollow fiber according to claim 1, wherein the fiber length is 100 m or more.

3. A hollow fiber according to claim 1, wherein the fiber has a wall thickness of from 2 to 60 microns and the bore has a circular cross-section of from 50 to 800 microns in diameter.

4. A hollow fiber according to claim 1, wherein the fiber is wound in a hank or cake form or on a spool.

5. A hollow fiber according to claim 1 wherein the gas is air or at least one component of air.

6. A hollow fiber according to claim 2, wherein the wall thickness is from 5 to 40 microns.

7. A hollow fiber according to claim 1, wherein the fiber has an outside diameter increase by wetting of from 25 to 50%, said outside diameter increase by wetting being defined as the outside diameter increase of the fiber due to immersion in a water bath maintained at 37° C. for a period of one hour divided by the outside diameter of the fiber in the dry state before immersion multiplied by 100.

8. A process for producing a hollow fiber of cuprammonium regenerated cellulose having an axially disposed cylindrical bore extending throughout the fiber length of at least 10 m and having on its surface wall no trace of a liquid, said bore having an inside diameter of from 50 to 800 microns and being filled with a gas, which comprises the steps of:

(1) extruding a spinning solution of cuprammonium cellulose through an annular orifice to form a fiber extrudate with a bore while simultaneously injecting a gas into the bore of the fiber extrudate through an injection tube provided in the center of the annular orifice;

(2) allowing said fiber extrudate to free fall in an air space and substantially vertically dive into a depth of from 2 to 20 mm below the surface of a coagulation bath only with a downward force gained during said free fall;

(3) passing the fiber extrudate through the coagulation bath to obtain a hollow fiber having an axially disposed cylindrical bore; and (4) refining and drying the so-obtained hollow fiber.

9. A process according to claim 8, wherein the fiber extrudate is allowed to dive into an increased depth of up to 30 mm below the surface of the coagulation bath by means of a direction-turning member provided in the coagulation bath.

10. A method of using a hollow fiber of cuprammonium regenerated cellulose having an axially disposed cylindrical bore extending throughout the fiber length, said fiber length being at least 10 m, said bore having an inside diameter of from 50 to 800 microns and being filled with a gas, said hollow fiber having on its inside wall no trace of a liquid, comprising using said hollow fiber as a dialysis membrane.

11. A hollow fiber of cuprammonium regenerated cellulose having an axially disposed cylindrical bore extending throughout the fiber length, said fiber length being at least 10 m, said bore having an inside diameter of from 50 to 800 microns and being filled with a gas, said hollow fiber having on its inside wall no trace of a liquid and said fiber being produced by the process comprising the steps of:

(1) extruding a spinning solution of cuprammonium cellulose through an annular orifice to form a fiber extrudate with a bore while simultaneously injecting a gas into the bore of the fiber extrudate through an injection tube provided in the center of the annular orifice;

(2) allowing said fiber extrudate to free fall in an air space and substantially vertically dive into a depth of from 2 to 20 mm below the surface of a coagulation bath only with a downward force gained during said free fall;

(3) passing the fiber extrudate through the coagulation bath to obtain a hollow fiber having an axially disposed cylindrical bore; and (4) refining and drying the so-obtained hollow fiber.

12. A hollow fiber according to claim 11, wherein the fiber extrudate is allowed to dive into an increased depth of up to 30 mm below the surface of the coagulation bath by means of a direction turning member provided in the coagulation bath.

* * * * *